(12) United States Patent
Klassen et al.

(10) Patent No.: US 7,730,398 B2
(45) Date of Patent: Jun. 1, 2010

(54) IMAGE STITCHING FOR MOBILE ELECTRONIC DEVICES

(75) Inventors: Gerhard Klassen, Waterloo (CA); David Tapuska, Waterloo (CA)

(73) Assignee: Research In Motion Limited, Waterloo, ON ( * ) Notice: Subject to any disclaimer, the term of this patent is extended or adjusted under 35 U.S.C. 154(b) by 1245 days.

(21) Appl. No.: 11/257,075

(22) Filed: Oct. 25, 2005

(65) Prior Publication Data

US 2007/0094588 A1 Apr. 26, 2007

(51) Int. Cl.
*G06F 17/00* (2006.01)
(52) U.S. Cl. .................................. 715/255; 715/864
(58) Field of Classification Search .......... 715/200, 715/255, 864
See application file for complete search history.

(56) References Cited

U.S. PATENT DOCUMENTS

| | | | | |
|---|---|---|---|---|
| 6,677,967 | B2* | 1/2004 | Sawano et al. | 715/839 |
| 7,107,605 | B2* | 9/2006 | Janik | 725/51 |
| 7,330,100 | B2* | 2/2008 | Yu | 340/5.61 |
| 2002/0026500 | A1* | 2/2002 | Kanefsky et al. | 709/219 |
| 2002/0052965 | A1* | 5/2002 | Dowling | 709/230 |
| 2002/0120779 | A1* | 8/2002 | Teeple et al. | 709/246 |
| 2002/0161928 | A1* | 10/2002 | Ndili | 709/246 |
| 2003/0040334 | A1* | 2/2003 | Lee | 455/557 |
| 2003/0106022 | A1* | 6/2003 | Goodacre et al. | 715/513 |
| 2003/0115311 | A1* | 6/2003 | Johnston-Watt et al. | 709/223 |
| 2003/0169928 | A1* | 9/2003 | Stanek | 382/232 |
| 2003/0202212 | A1* | 10/2003 | Burgess et al. | 358/1.18 |
| 2003/0233379 | A1* | 12/2003 | Cohen et al. | 707/200 |
| 2004/0219925 | A1* | 11/2004 | Ahya et al. | 455/450 |
| 2005/0097463 | A1* | 5/2005 | Yu | 715/531 |
| 2005/0111645 | A1* | 5/2005 | Aoyama et al. | 379/142.06 |
| 2006/0140508 | A1* | 6/2006 | Ohgishi et al. | 382/284 |
| 2006/0161953 | A1* | 7/2006 | Walter et al. | 725/48 |
| 2009/0021594 | A1* | 1/2009 | Tsuda et al. | 348/222.1 |

FOREIGN PATENT DOCUMENTS

WO 20040052035 A 6/2004

OTHER PUBLICATIONS

Luo et al., Displaying Images on Mobile Devices: Capabilities, Issues, and Solutions, Google 2002, pp. 585-594.*

(Continued)

*Primary Examiner*—Cong-Lac Huynh
(74) *Attorney, Agent, or Firm*—Ridout & Maybee LLP

(57) ABSTRACT

A device and method for modifying content for use on a mobile electronic device. The content includes (i) a plurality of content image files each including graphics information for generating an associated image and (ii) computer instructions including references to the plurality of image files for causing the associated images to be displayed on a display screen. A plurality of image files are selected from the content that can be combined together to form a single image file that will have a smaller file size than the sum of the file sizes of the selected image files. The selected image files are combined into a single merged image file. The computer instructions are amended to accommodate the merged image file.

20 Claims, 7 Drawing Sheets

OTHER PUBLICATIONS

Gausemeier et al., Development of a Real Time Image Based Object Recognition Method for Mobile AR-Devices, ACM 2003, pp. 133-140.*

Bruijn et al., RSVP Browser: Web Browsing on Small Screen Devices, Google 2002, pp. 245-252.*

Banerjee et al., Online Transcoding of Web Pages for Mobile Devices, Google 2003, pp. 271-285.*

Luo et al., Displaying Images on Mobile Devices: Capabilities, Issues, and Solutions, IEEE 2002, pp. 1-4.*

Butlerblog, Chad Butler's Weblog—"Further Optimization of the W3C Validation Images", Jun. 13, 2005, XP-002378110.

Website Optimization—"Chapter 12: Optimizing Web Graphics", 2003, XP-002378111.

Fiftyfoureleven.com—"CSS Sprites, Background Images and Website Optimization", May 13, 2004, XP-002378112.

San Diego State University Web Style Guide—"Design Considerations", 2004, XP-002378113.

Ross Shannon—"Optimising Images", Feb. 2, 2005, XP-002378114.

European Search Report issued May 10, 2006 for Appln. No. 05109933.1.

Divx Networks, DivX Player 2.0 Skin Specification, Document Revision 1 Feb. 28, 2002.

* cited by examiner

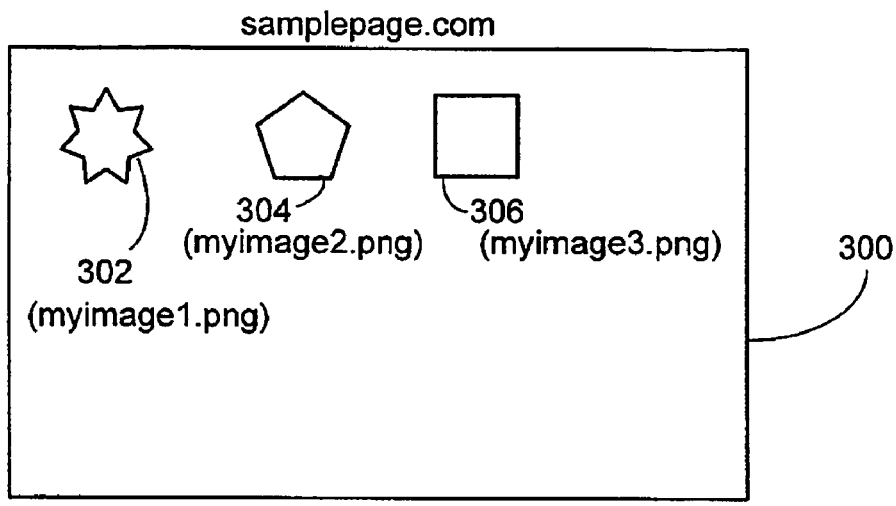
FIG. 3
```
                                          310
                                    samplepage.com
<html>
<image href="myimage1.png"/>
<image href="myimage2.png"/>
<image href="myimage3.png"/>
</html>
```
FIG. 4
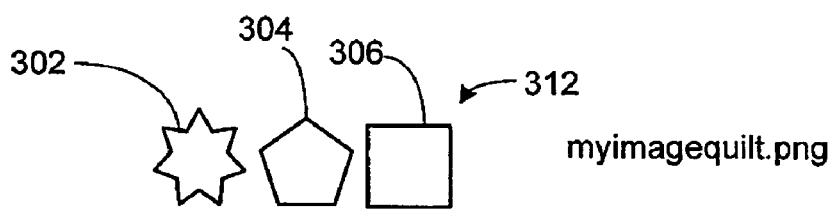
myimagequilt.png
FIG. 5
```
                                          314
                                    samplepage.com
<html>
<image href="myimagequilt.png#(0,0,32,32)"/>
<image href="myimagequilt.png#(32,0,32,32)"/>
<image href="myimagequilt.png#(64,0,32,32)"/>
</html>
```
FIG. 6 samplepage.com ← 316

```
<html>
<image href="myimagequilt.png" clip="0,0,32,32"/>
<image href="myimagequilt.png" clip="32,0,32,32"/>
<image href="myimagequilt.png clip="64,0,32,32"/>>
</html>
```

| Image ID | Image Coordinates |
|---|---|
| #1  320 | 0,0,32,32  322 |
| #2 | 32,0,32,32 |
| #3 | 64,0,32,32 |

```
<html>
<image href="myimagequilt.quilt#1"/>
<image href="myimagequilt.quilt#2"/>
<image href="myimagequilt.quilt#3"/>
</html>
```

```
<html>
<object.data="myimagequilt.quilt#1" codebase="quiltplugin"/>
<object.data="myimagequilt.quilt#2" codebase="quiltplugin"/>
<object.data="myimagequilt.quilt#3" codebase="quiltplugin"/>
</html>
```

FIG. 10

IMAGE STITCHING FOR MOBILE ELECTRONIC DEVICES

FIELD OF TECHNOLOGY

The present application relates to preparing content for delivery to mobile electronic devices, and in particular to the preparation of content including image data to mobile electronic devices.

BACKGROUND INFORMATION

The communications link between a wireless enabled mobile electronic device and a content source often includes a communications channel that has a delivery capacity that is less than that typically available between a stationary device and a content source. Additionally, mobile devices will often have on-board resources, such as memory for example, that are less than that of a stationary devices.

The use of mobile devices to wirelessly receive and view enriched content including images is expanding. However, content that has been created for wider bandwidth communications channels and memory rich devices can be cumbersome to receive and use in the limited bandwidth and limited memory environment of mobile communications.

Accordingly, a content delivery system and method that provides for improved efficiency in the delivery and use of content for mobile devices is desirable.

BRIEF DESCRIPTION OF THE DRAWINGS

Embodiments will now be described, by way of example only, with reference to the attached Figures, wherein:

FIG. 3 shows an example of a simple webpage for explaining embodiments of the invention;

FIG. 4 shows an example of an HTML file for displaying the simple webpage of FIG. 3;

FIG. 5 shows a representation of a simple merged image for explaining embodiments of the invention;

FIG. 6 shows a first example of a modified HTML file for displaying the simple webpage of FIG. 3;

FIG. 7 shows a further example of a modified HTML file for displaying the simple webpage of FIG. 3;

FIG. 8 shows an example of image information embedded in a merged image file for the simple webpage of FIG. 3;

FIG. 9 shows a further example of a modified HTML file for displaying the simple webpage of FIG. 3;

FIG. 10 shows a further example of a modified HTML file for displaying the simple webpage of FIG. 3;

Like reference numerals are used throughout the Figures to denote similar elements and features.

DETAILED DESCRIPTION

Figure 1:
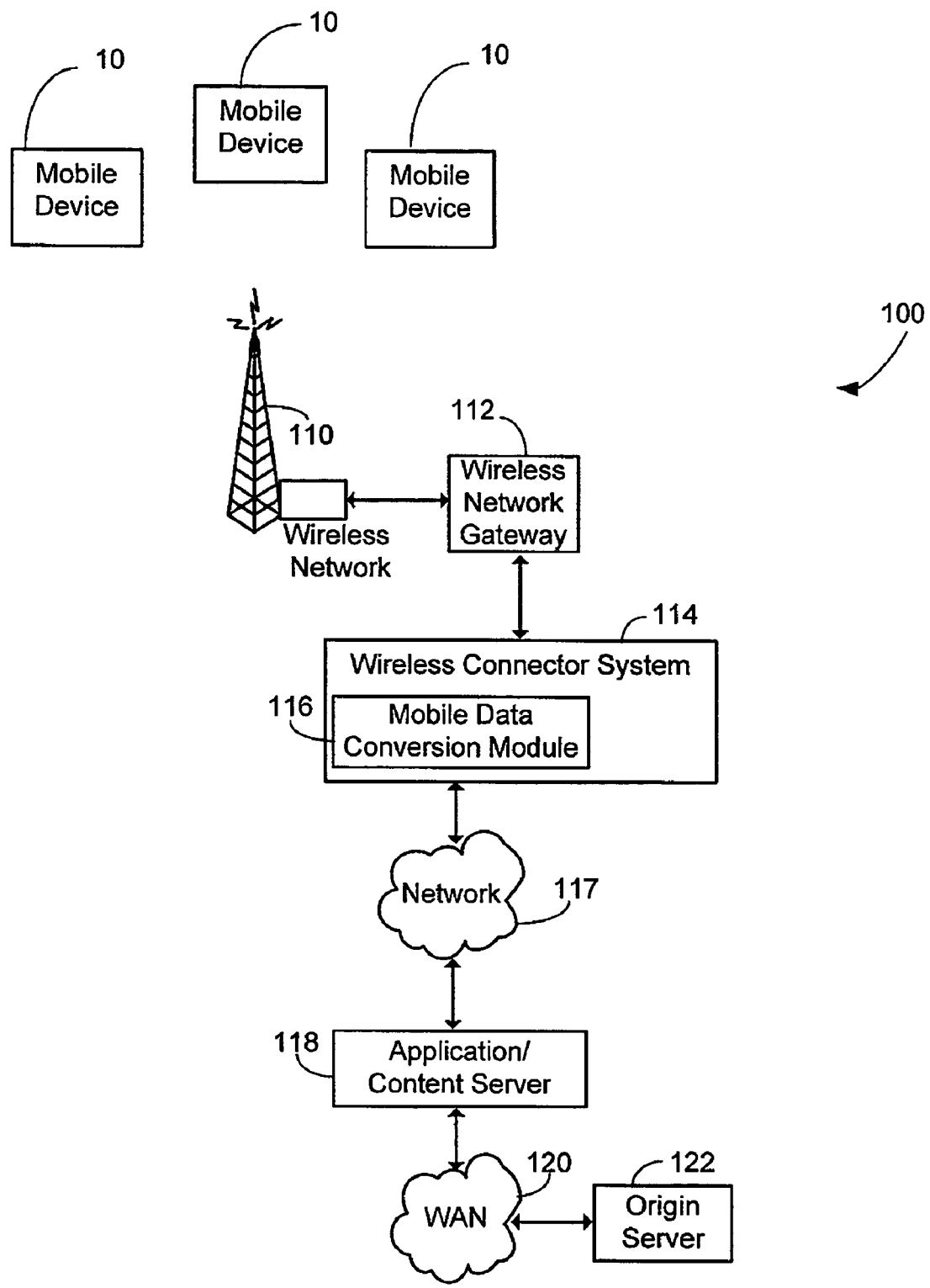
FIG. 1 is a block diagram of a communications system to which embodiments may be applied.

Downloadable content such as Internet webpages and mobile device applications often make use of several small images that consume significant wireless network bandwidth to download as well as significant storage space on the mobile device. Among other things, the present application describes methods, devices, and computer program products in which images from separate image files obtained from a content source are combined into a single image file for transmission over a communications channel and/or use on a mobile electronic device.

In one aspect, the present application provides an automated method for modifying content for use on a mobile electronic device. The method includes (a) receiving content that includes (i) a plurality of content image files each including graphics information for generating an associated image and (ii) computer instructions including references to the plurality of image files for causing the associated images to be displayed on a display screen; (b) selecting from the content image files a plurality of image files that can be combined together to form a single image file that will have a smaller file size than the sum of the file sizes of the selected image files; (b) selecting from the content image files a plurality of image files and combining the selected image files into a single merged image that has a smaller file size than the sum of the file sizes of the selected image files; (c) amending the computer instructions to accommodate the merged image file; (d) providing the merged image file and the amended computer instructions to the mobile electronic device.

In another aspect, the present application provides a wireless connector system for interfacing between a content source and a wireless network servicing a plurality of mobile electronic devices, the content source providing content including (i) a plurality of content image files each including graphics information for generating an associated image and (ii) computer instructions including references to the plurality of image files for causing the associated images to be displayed on a display screen. The wireless connector system includes a server computer including a data conversion module for converting content into a format for communication over the wireless network, the data conversion module including: (a) selection means for selecting from the content image files a plurality of image files that can be combined together to form a single image file that will have a smaller file size than the sum of the file sizes of the selected image files; (b) combining means for combining the selected image files into a single merged image file; and (c) amending means for amending the computer instructions to accommodate the merged image file. The wireless connector system is configured for sending the merged image file and the amended computer instructions over the wireless network to the mobile electronic device.

In yet another aspect, the present application provides a computer program product having a computer-readable medium tangibly embodying computer executable instructions for instructions for modifying content for use on a mobile electronic device, the content including (i) a plurality of content image files each including graphics information for generating an associated image and (ii) computer instructions including references to the plurality of image files for causing the associated images to be displayed on a display screen. The computer executable instructions include executable instructions for: (a) selecting from the content image files a plurality of image files that can be combined together to form a single image file that will have a smaller file size than the sum of the file sizes of the selected image files; (b) combining the selected image files into a single merged image file; (c) amending the computer instructions to accommodate the merged image file; and (d) providing amended content including the merged image file and the amended computer instructions for transfer to the mobile electronic device.

Referring first to FIG. 1, there is a block diagram of a communication system 100 to which example embodiments of the present application may be applied. The communication system 100 includes mobile electronic devices 10, a wireless network 110 for communicating with the mobile electronic devices 10, and a wireless network gateway 112 for interfacing with a wireless connector system 114 that is connected to a client network 117. The client network 117 may include a local area network, an intranet, the Internet, a direct connection, and combinations thereof, however in at least some example embodiments client network 117 will be an intranet for a corporation or organization. An application/content server 118 may be connected to the client network 117 and also to a further network such as a Wide Area Network (WAN) 120. The WAN 120 may connect with other networks, and the WAN 120 can in various embodiments include the Internet, a direct connection, a local area network (LAN), a wireless communication link, and any combinations thereof. Content providers, such as web servers, may be connected to the WAN 120, an example of which is shown in FIG. 1 as origin server 122.

In one example embodiment, mobile electronic devices 10 are hand-held two-way mobile communication devices 10 having at least data and possibly also voice communication capabilities. In an example embodiment, the devices 10 have the capability to communicate with other computer systems on the Internet. In various embodiments, mobile electronic devices 10 may include, by way of non limiting example, data communication devices, multiple-mode communication devices configured for both data and voice communication, mobile telephones, mobile communication devices, PDAs enabled for wireless communications, and wireless modems operating in conjunction with computer systems. In the presently described embodiment, each of the mobile electronic devices 10 is configured to operate within the wireless network 110.

Wireless mobile network 110 is, in an example embodiment, a wireless packet data network which provides radio coverage to mobile electronic devices 10, and could be a number of different types of network including by way of non-limiting example, Mobitex Radio Network, DataTAC, GSM (Global System for Mobile Communication), GPRS (General Packet Radio System), CDMA (Code Division Multiple Access), iDEN or various other third generation networks such as EDGE (Enhanced Data rates for GSM Evolution) or UMTS (Universal Mobile Telecommunications Systems).

The wireless network gateway 112 provides translation and routing services between one or more wireless connector systems 114 and wireless networks 110 to facilitate communication between mobile devices 10 and devices connected, directly or indirectly, to wireless connector system 114. The wireless connector system 114 is a server that in at least some examples is located behind a firewall and provides access for mobile devices 10 to the devices connected, for example through intranet 117, to the wireless connector system 114. The wireless connector system 114 includes a mobile data conversion module 116 that coverts content and information received from devices connected to wireless connector system 114 into a format more suitable for transmission over wireless network 110 to mobile electronic devices 10. In at least one embodiment, the data conversion module 116 is implemented through computer program instructions that reside on a persistent storage on the wireless connector system 114, and which are executed by one or more microprocessors. In some embodiments, the data conversion module 116 could be implemented on a separate computer than the wireless connector system 114. In an example embodiment, the data conversion module 116 provides HTTP connectivity between the wireless network 110 and devices and/or networks connected directly or indirectly to wireless connector system 114. The network 117, application/content server 118, WAN 120 and origin server 122 are collectively and/or individually or in various combinations a content source for the wireless connector system 114. The system shown in FIG. 1 is but one possible configuration for a communications system on which embodiments of the invention may be implemented.

According to example embodiments of the invention, content received by the data conversion module 116 that is destined for a mobile electronic device is converted into a format that is more suitable for transmission over a limited bandwidth communications channel available in wireless network 110. In at least some example embodiments discrete images contained in Internet web pages are merged by the data conversion module 116 into a single image for download over the wireless network 110. In at least some example embodiments, images used in applications that are being loaded onto a mobile electronic device 10 are merged by the data conversion module 116 prior to loading onto the mobile electronic device 10. In example embodiments, images with a relatively common dimension and/or color space may be merged into a single image having a size less than that of the cumulative sizes of the separate images. In the combined image, the overhead of the graphics header and color lookup information is required only once for the combined image, rather than for each separate image. In addition, the compression used in common image file formats such as PNG (Portable Network Graphics), JPEG (Joint Photographic Experts Group) and GIF (Graphics Interchange Format) is improved in many cases when there is more image data in a particular file.

As will be explained in greater detail below, the mobile data conversion module 116 is configured to analyse a set of images and select appropriate images to be "stitched" or combined together to reduce cumulative file size. In the case of a webpage, the HTML (Hyper Text Markup Language) or other instructions used to represent the webpage are also modified by the mobile data conversion module 116 to reference a part of the stitched image in place of individual images. In the case of a software application, the application code referring to the individual images are similarly modified by the mobile data conversion module 116 to refer to a part of the stitched image in place of individual images. For example, an XML (Extensible Markup Language) style sheet used to generate a graphical user interface for an application can be modified by the mobile data conversion module 116.

Figure 2:
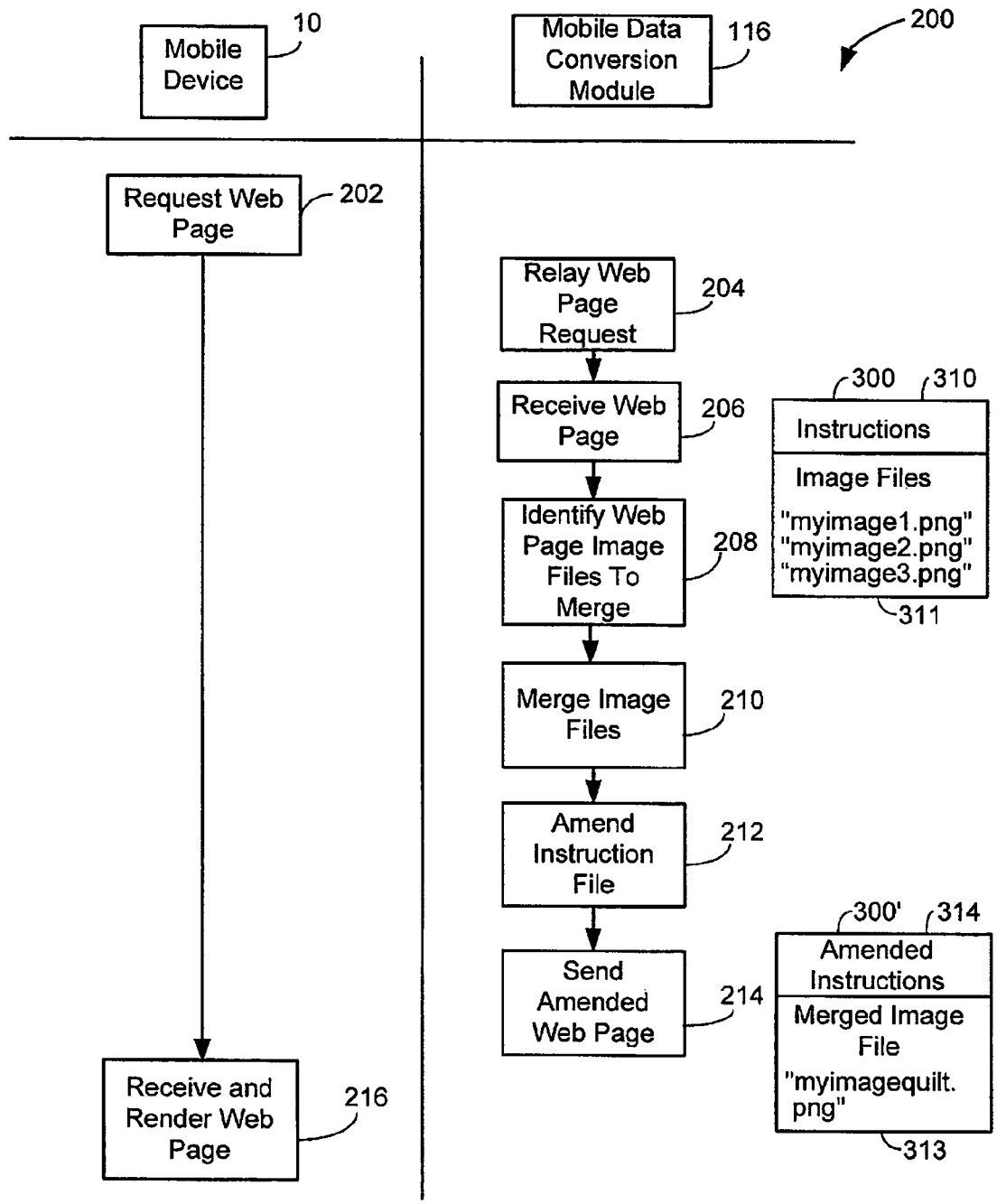
FIG. 2 is a block diagram showing a method for processing image and instruction files associated with a Webpage, according to example embodiments.

FIG. 2 provides a block diagram overview showing method 200 for processing of image and instruction files associated with a Webpage according to example embodiments of the invention. Method 200 will be described in the context of a non-limiting example with reference to FIGS. 3 and 5, which show a simple webpage and representation of a merged image file, respectively. In the method 200, as indicated in step 202, a mobile electronic device 10 having a Web browser transmits a webpage request over wireless network 110.

With reference to FIGS. 2 and 3, in the presently described example, the requested webpage is "samplepage.com" 300, which includes three similar sized and similar color themed images, namely a star 302, a pentagon 304, and a square 306. As known in the art, the information needed for rendering the Webpage "samplepage.com". 300 will typically include an instruction file 310 and associated image files 311. The instruction file may be an HTML file which defines the structure and layout of a Web document by using a variety of tags and attributes, which in turn refer to image files. In the present example, FIG. 4 shows a very simple HTML source file 310 for generating the Webpage samplepage.com 300. The instruction file 310 references three image files, namely myimage1.png which includes graphic information for rendering the star 302; myimage2.png which includes graphic information for rendering the pentagon 304; and myimage3.png which includes graphic information for rendering the square 306. Although PNG graphics files are used in the present example, embodiments of the invention could also be used with different graphic file formats such as JPEG or GIF for example.

Turning again to FIG. 2, the webpage request from mobile device 10 is routed through the wireless network 110 and wireless network gateway 112 to the data conversion module 116 of a wireless connector system 114. As indicated in step 204, the data conversion module 116 relays the webpage request to the source of the web page. In one example, the webpage request may be routed through client network 117, application/content server 118, and Internet 210 to an origin server 122 on which the requested webpage resides. In some examples, the application/content server 118 or another server connected to the data conversion module 116 through client network 117 could be the origin server. As indicated in step 206, the data conversion module 116 receives the requested webpage, including the HTML file 310 and referenced image files myimage1.png, myimage2.png and myimage3.png from the content source.

As indicated in step 208, once the data conversion module 116 receives the requested webpage it automatically identifies images within the subject webpage for merging. In example embodiments images are selected for merging into a larger image based on predetermined merger rules such that the image file defining the merged image will generally have a smaller file size than the sum of individual image files that define the individual images that are being merged. In one example embodiment, all images having a same or similar common dimension, for example images having the same height in pixels are selected for merging and then any remaining images having the same width in pixels are selected for merging. In some example embodiments, the images do not need the same dimension, but require a similar dimension—for example images falling within a predetermined variance in height in pixels may be merged, and images falling within a predetermined variance in width in pixels may be merged.

It will be understood by those skilled in the art that images are often saved in format that includes indexes into a color table or palette instead of raw color information. For example, GIF and PNG files are typically saved in a paletted color image format, whereas JPEG files are full color image files. If several images having different colors are merged, then in some circumstances the resulting merged image file may have a larger file size than the sum of the individual images. Thus, in some embodiments, image color is taken into consideration when selecting files for merger in that images having similar colors are selected for merger and images lacking a commonality of color within predetermined thresholds are rejected as merger candidates. In some example embodiments, a combination of characteristics are considered when selecting images for merger—for example, files having both a same or similar common dimension and a similar color scheme (within predetermined limits established for determining a similar color scheme) are selected for merging.

In some example embodiments, the images selected for merging do not need to have common dimensions, but rather just be able to be combined together into a larger image that has a smaller resulting file size than the sum of the files of the individual images. Such a combination may be achieved simply by an automated repetitive trial and error process in which the size of the combined file is compared against the size of the individual files or by more involved algorithms. In some example embodiments as will be explained in greater detail below, images having common sub-areas may be merged with the sub-areas overlapping.

In the example webpage 300 of FIG. 3, each of the images 302, 304 and 306 are 32 pixels wide and 32 pixels high and share a common colour palette. Accordingly, their respective image files myimage1.png, myimage2.png and myimage3.png are selected for merger by data conversion module 116. The use of a series of images having common dimensions and colors is relatively common on web pages—for example similar images may be used as headings or topic dividers throughout a webpage. Accordingly, combining images having a common dimension and/or similar color scheme will often result in a smaller cumulative file size for a webpage. Similarly, applications often use similar colors and dimensions for visual images associated with the same skin or theme, and thus combining images having a common dimension and/or similar color scheme will often result in a smaller cumulative file size for an application. As indicated in step 210, once the image files for merger have been selected they are then merged by the data conversion module 116. In one example embodiment, images having the same height are merged into a single image in which the formerly separate images are arranged adjacent each other in a row. By way of example, FIG. 5 shows the merged image 312 that includes the star 302, pentagon 304 and square 306 image elements of the previously separate images arranged in a row that is 96 pixels wide and 32 pixels high. The graphic information for generating the merged image 312 is contained in merged image file myimagequilt.png, which, when header information and other file overhead is taken into account, has a total file size less than that of the separate image files myimage1.png, myimage2.png and myimage3.png. In some embodiments, images of common width are merged into an image in which the formerly separate images are arranged adjacent each other in a column—for example, the images 302, 304 and 306 could alternatively be arranged in a column rather than a row. In various other embodiments, the images are merged in different merged image configurations—for example, rows and columns of images could be packed into a rectangular shaped image that includes an array of merged images.

As indicated in step 212 of FIG. 2, in order to allow the merged images to be correctly displayed at the target mobile device, the webpage instructions that refer to the original individual images are automatically modified to by the data conversion module 16. There are a number of ways that the webpage source code could be modified by data conversion module 16. In one example embodiment, when merging the individual images the data conversion module 116 keeps track of the relative location of the original images within the merged image and the image href attributes in the HTML source file are modified to indicate a portion of the merged image to be rendered at each location. By way of example, FIG. 6 shows a modified HTML source file 314 created by the mobile data conversion module 116 for the generating the webpage 300 (samplepage.com) from merged image file myimagequilt.png. In the modified file 314, the rectangular (X, Y) coordinates of the original images 302, 304 and 306 within the merged image 312 are specified so that the web browser at the mobile device 10 can extract the original images from the merged images. Such an embodiment requires that the web browser on the mobile device 10 be configured during a set up or updating process to recognize the appended coordinate data in the modified HTML file. In embodiments where images of a common height are always merged horizontally into a row, then only X coordinate information may be required in the coordinate data, and similarly in embodiments where images of a common width are always merged vertically into a column, then only Y coordinate information may be required in the coordinate data.

A similar coordinate based modification method is to modify the webpage instruction file to use a custom image tag to indicate what region of the merged image to render, and in this regard, FIG. 7 shows a further example of a modified HTML source file 316 for rendering the webpage 300 (samplepage.com) from the merged image file myimagequilt.png. In such embodiment, the web browser on mobile device 10 is configured to recognize the custom tags.

In yet another example embodiment, information specifying the location of the individual images within the merged image embedded within the merged image file itself when the merged file is created by the data conversion module 116 in step 210. In such an embodiment, the merged image file could be a custom format having a predetermined file extension (eg. ".quilt"), with the merged image file having a name like "myimagequilt.quilt". The custom format could, for example, be the similar to a common format such as .png format, but include extra information in a custom header field identifying the locations of the individual images within the merged image. By way of reference to FIG. 8, the image file myimagequilt.quilt may include in its header a table 318 of image information which contains an index of images, each referred to by an assigned identification ID 320 (#1, #2 and #3, corresponding to star 302, pentagon 304 and square 306 in the present example) that is mapped to a specific location (coordinates 322). In such an example, in step 212, the webpage source code is automatically amended by the data conversion module 116 to refer to the merged image file and the assigned ID's for the respective image. By way of example, FIG. 9 shows a further example of a modified HTML source file 324 for rendering the webpage 300 (samplepage.com) from the custom merged image file myimagequilt.quilt. The browser on the mobile device 10 is pre-configured, through a plug-in for example, to recognize the custom format. Alternatively, the HTML source file may be modified in step 312 to replace image element references with <object> or <embed> elements, and in this regard FIG. 10 shows a further example of a modified HTML source file 326 for rendering the webpage 300 (samplepage.com) from the custom merged image file myimagequilt.quilt Referring again to FIG. 2, once the requested web page has been processed by the data conversion module 116 to merge the image files and amend the webpage source code (instruction file), the amended webpage 300' (which includes the merged image file 313 and the amended instruction file 314) is then sent over the wireless network 110 to the requesting mobile device 10. Device 10 which then renders the webpage on its display screen according to the modified instructions.

Figure 11:
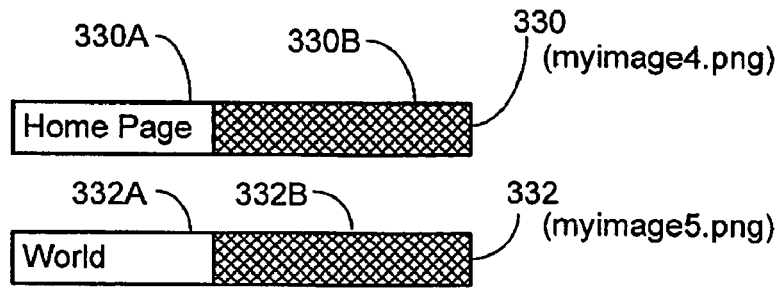
FIG. 11 shows examples of a further images for explanatory purposes.

Although a number of different examples have been described above in terms of image combining techniques, other combining methods are also possible. For example, in some cases images may have common sub-regions which are identified and then overlapped in the merged image in order to avoid duplication of graphics information common to the images. By way of example, FIG. 11 shows two example images 330 and 332 associated with the image files "myimage4.png" and "myimage5.png". The image 330 has sub-regions 330A and 330B, and the image 332 has sub-regions 332A and 332B. In one example embodiment, during identification step 208, the data conversion module 116 using a comparison algorithm determines that images 330 and 332 in a requested webpage have a common width (i.e. along the x axis) and height (i.e. along the Y axis), and furthermore, have common sub-areas 330B and 332B, and that the sub-area 332B, when rotated 180 degrees, is still identical to sub-area 330B. In such embodiment, the conversion module merges images 330 and 332 by inverting sub-image 332A and attaching it to the end of the image 330, and cutting the data associated with common image sub-region 332B, forming merged image 334 which is described in merged graphic file "images4and5quit.png". The source code for the webpage is amended in step 212 so that previous references to image file "myimage4.png" refer to sub-regions 33A and 330B of the merged image 334 and previous references to image file "myimage5.png" refer to sub-regions 332A and 330B, rotated 180 degrees, of the merged image 334.

Figure 12:
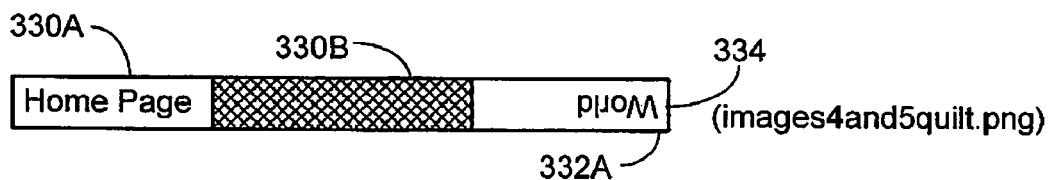
FIG. 12 shows a merged version of the images of FIG. 11 for explanatory purposes.

Thus, it will be appreciated by the example of FIGS. 11 and 12 that in some example embodiments identical regions of separate images that are to be merged can be identified and the images combined so that the image data for the common regions is only included once in the merged image. Additionally, in some example embodiments, images may be rotated or transformed in order to achieve efficient packing of the individual imaged into the merged image.

As indicated above, the image combining methods of the present invention can also be applied to applications that are loaded onto a mobile device 10. Applications may be downloaded to the device 10 over wireless network 110, in which case it is desirable to minimize file size to reduce consumption of communications channel resources and device on-board memory. Alternatively, in some embodiments, applications may be loaded onto the device 10 through wired link such as a docking station or a short range wireless link such as a wireless LAN having a higher bandwidth channel than network 110. In such cases, reduced file size is still desirable to limit consumption of on-board memory. In some configurations, a downloaded file is not an entire application, but rather a file or files used by an application on the device to generate visual images in a graphical user interface. For example, the downloaded file could be a theme file that includes a number of image files and instructions, including for example, a style sheet that refers to the image files. The theme file can be used by an application on the device to generate a themed user interface.

Figure 13:
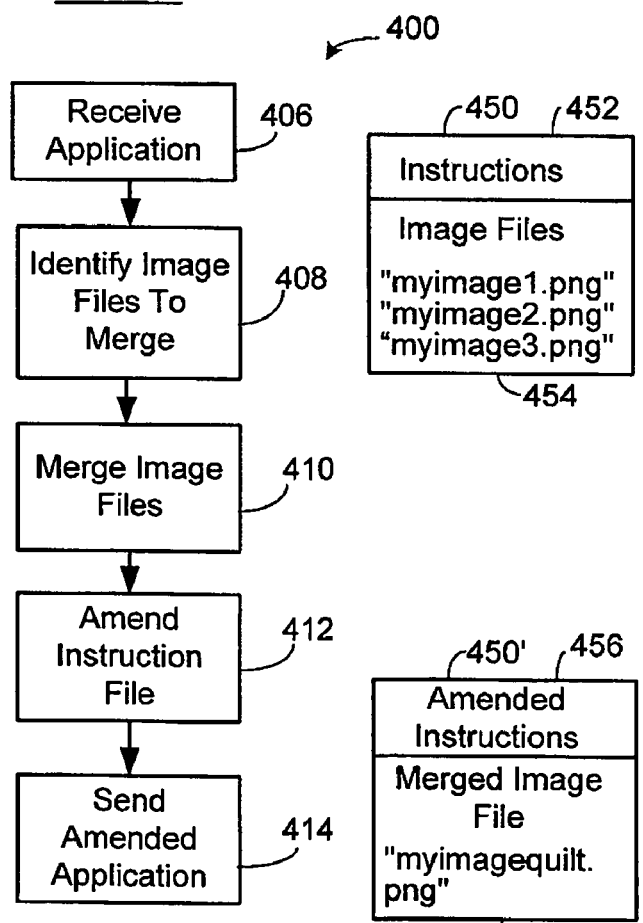
FIG. 13 is a block diagram showing a method for processing image and instruction files associated with an application, according to example embodiments.

FIG. 13 shows a method 400 used by data conversion module 116 when converting an application (including for example a theme file) according to example embodiments. Application conversion method 400 is similar to webpage conversion method 200 described above, and begins, as indicated in step 406, with the data conversion module 116 receiving from a source an application (or theme file) 450 destined for a mobile device 10. The application includes both a source code instructions 452 and image files 454 that are referenced in the instructions 452. In the case of a theme file, instructions 452 could be in the form of an XML style sheet. The data conversion modules goes through steps of identifying image files for merger (step 408) and merging the identified image files (step 410) in a substantially identical manner to which image files are identified and merged in webpage conversion method 200 described above. The application instructions, e.g. source code, (or style sheet in the case of a them file) is then automatically amended by the data conversion module 116, as indicated in step 412, to reference the appropriate sub-portions of the merged image file 458. In one example embodiment, the instructions are amended so that references to the individual image files 454 are replaced with references to corresponding sub-regions of the merged image file—for example, using the coordinate system discussed above, a reference to "myimage1.png" is changed to "myimagequilt.png#(0,0,32,32)". Alternatively, further code could be added to the source code such that when the application requests an original image file "myimage1.png", the appropriate portion of the merged image is returned instead. Additionally, the other instruction and/or image file modification techniques discussed above in the context of webpages could also be applied to applications.

As indicated in step 414, the amended application 450' (or theme file), including its amended instructions 456 and image file 458 is then sent to a mobile device 10 on which the application is implemented. As suggested above, the amended application 450' (or theme file) may be loaded on the device 10 in different ways in different embodiments, including for example through wireless network 110, through a sort range wireless network connection, or through a wired docking station link, among others.

Thus, the presently described methods and systems are concerned with reducing data provided to a mobile device 10 in an automated setting. In some embodiments, the modified content 300', 450' could include a plurality of merged image files, each of which includes a group of merged images.

Figure 14:
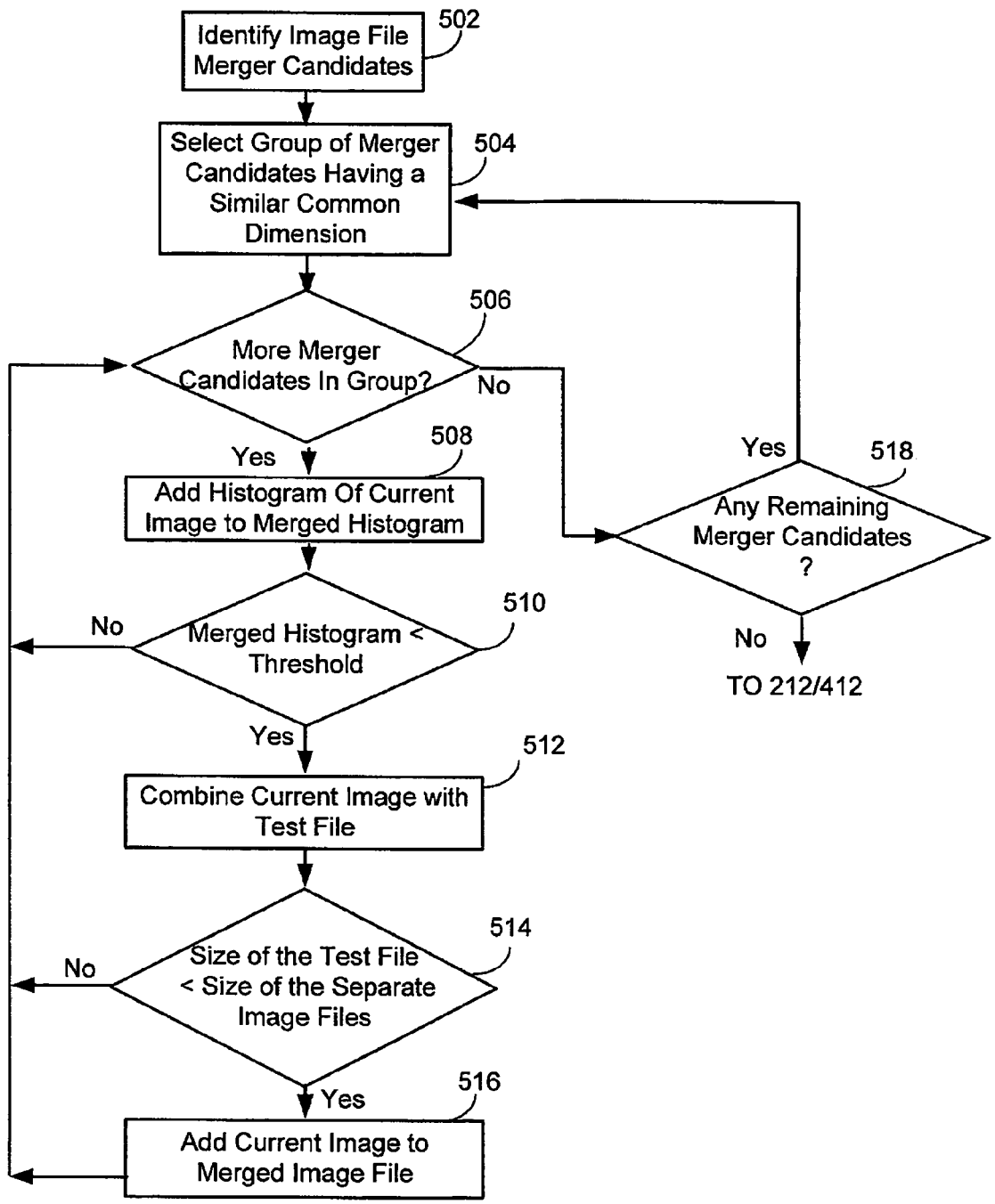
FIG. 14 is a block diagram showing an example of a method for identifying image files for merger and merging such files.

Various example embodiments for identifying and merging image files have been discussed above. One example methodology that can be implemented by mobile data conversion module 116 for merging and identifying image files in steps 208 and 210 of process 200 (and steps 408-410 of process 400) will now be described in greater detail with reference to FIG. 14. As indicated at block 502 in FIG. 14, all the image files that are referenced by an instruction set (which may, among other things, take the from of an HTML file defining a web page, source code for an application, or a XML style sheet) are identified as possible merger candidates. In some embodiments, one or more referenced image files may be excluded in step 502 as merger candidates based on predetermined conditions—for example, some image files may be known to be located already at the mobile device, and thus not required by the device.

Once all the image file merger candidates have been identified, an iterative process of identifying suitable files for merging is carried out, as indicated by steps 504 to 518. As indicated in step 504, the identified merger candidates are compared against each other to select a group of merger candidates having a similar common dimension—for example all images having a similar height (within a predetermined +/−tolerance) may be selected as potential merger candidates for a group. Alternatively or additionally, all images having a similar width (within a predetermined +/−tolerance) may be selected as potential merger candidates for a group. Once a selected group of images having a same or similar common dimension has been identified the images within that group are evaluated one at a time and suitable files within the group merged as indicated at steps 506-516. In the case of images saved in a paletted color image format, as indicated in steps 508 and 510, histograms of the colors used in the group merger candidates are examined to determine if, from a color perspective, merging of the merger candidate images within the selected group is justified. In particular, as each of the merger candidates within the group is being evaluated, as indicated in step 508 a histogram of the image currently being evaluated is combined with a merged histogram of the images within the group that have already been merged. As indicated in step 510, if the addition of the histogram of a current merger candidate within the group to the combined histogram results in a combined histogram exceeding the threshold, the merger candidate being evaluated is rejected from the selected group and placed back in the pool of possible merger candidates for possible inclusion in another selected group, and another merger candidate within the current group is evaluated. In the case where the merged histogram falls below the threshold size in step 510, the image that is currently being evaluated is combined with the merged image file for the selected group to form a test merged image file (step 512). In one example embodiment, the images within the selected group are combined horizontally when the similar dimension within the group is height, and vertically when the similar dimension is width. Alternatively, the images are combined in a two dimensional array in some embodiments. In some example embodiments, all three combining methods are performed for a group, and the method that produces the test file having the smallest file size is selected.

As indicated at step 514, once the image that is currently being processed is added to the test file, a check is made to ensure that the size of the merged test file image including the currently processed image is less than the sum of the size of the merged image file not including the currently processed image and the sizes of the image file for the currently processed image (i.e. the sum of the whole is less than the sum of the parts). In the event that the size of the test file exceeds the threshold, then the image currently being processed is rejected from the group and placed back in the pool of possible merger candidates for possible inclusion in another selected group, and another merger candidate within the current group is evaluated. As indicated in step 516, if the addition of the image currently being evaluated to the test file results in a file in which the size of the whole is less than the parts, then the image is added to a merged image file for the selected group. The coordinates of the image within the merged image file are tracked so that the instructions that referenced the image can be suitable amended. As can be appreciated from FIG. 14, the processing steps 508-516 are carried out all image files in a selected group. When all the image file merger candidates in a selected group (i.e. those having a similar common dimension) have been processed, then as indicated in step 518, the another group of candidates is identified and the process continues until all image files that can be combined have been combined. It will be appreciated that the process of FIG. 5 can be varied in a number of ways. For example, steps 508 and 510 would typically be omitted in the processing of full color images (as opposed to paletted images).

Figure 15:
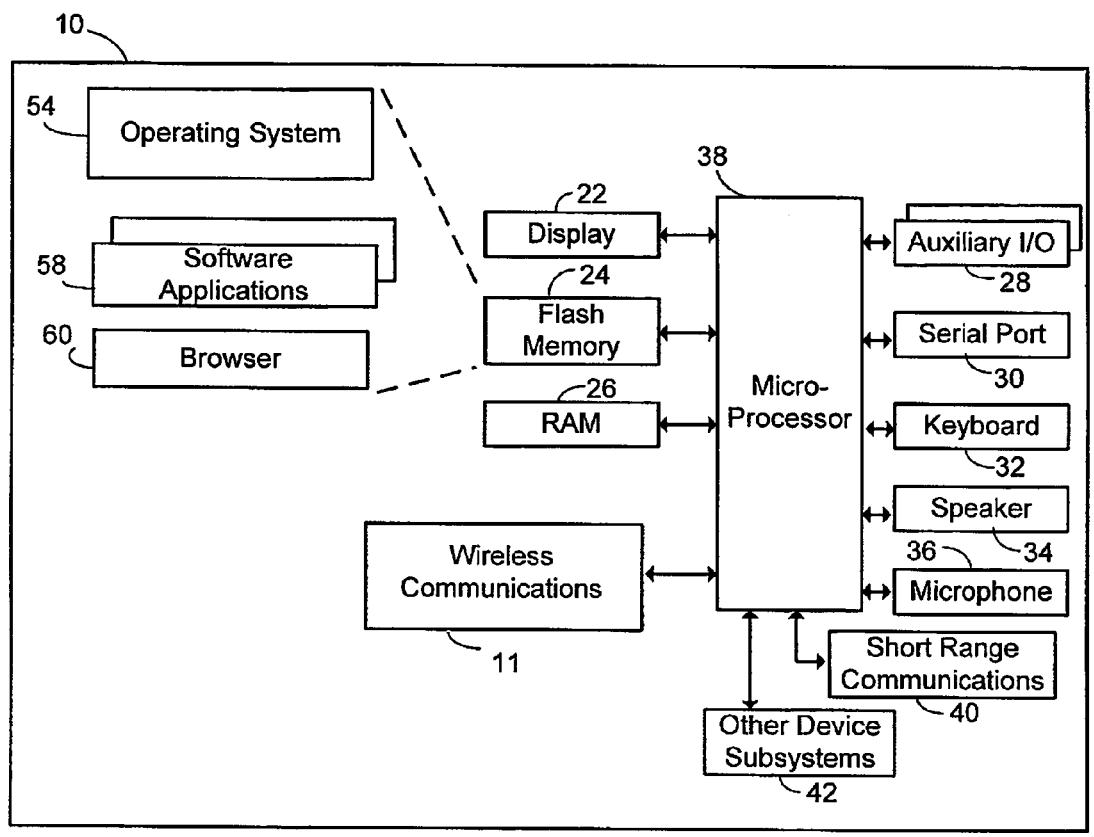
FIG. 15 is a block diagram showing an example of a mobile electronic device that can be used in the communications system of FIG. 1.

An example of a mobile electronic device 10 with which at least some embodiments of the invention may be used is shown in FIG. 15. The device 10 includes a wireless communication subsystem 11 for two-way communications with wireless network 110. The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28 (which may include a thumb-wheel, for example), serial port 30 (which may include a USB port, for example), keyboard or keypad 32, speaker 34, microphone 36, a short-range communications subsystem 40, and any other device subsystems generally designated as 42.

Operating system software 54 and various software applications 58 used by the microprocessor 38 are, in one example embodiment, stored in a persistent store such as flash memory 24 or similar storage element. Software applications 58 may include a wide range of applications, including an address book application, a messaging application, a calendar application, and/or a notepad application. One application included among applications 58 in web-enabled embodiments of device 10 is a web browser 60. Each software application 58 may include layout information defining the placement of particular fields in the user interface for the software application 58, such as text fields, input fields, etc. Those skilled in the art will appreciate that the operating system 54, specific device applications 58, or parts thereof, may be temporarily loaded into a volatile store such as RAM 26. Received communication signals may also be stored to RAM 26.

The microprocessor 38, in addition to its operating system functions, enables execution of software applications 58 (which can include software applications 450') on the device. A predetermined set of applications 58 which control basic device operations, including at least data and voice communication applications for example, will normally be installed on the device 10 during manufacture. Further applications (for example applications 450') may also be loaded onto the device 10 through the network 110, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or webpage download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 could be a USB type port implemented in a personal digital assistant (PDA)-type communication device for which synchronization with a users desktop computer (not shown) may be desirable. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ or IEEE 802.11b/g communication module to provide for communication with similarly enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. An automated method for modifying content for use on a mobile electronic device, including:
    receiving content that includes (i) a plurality of content image files each including graphics information for generating an associated image and (ii) computer instructions including references to the plurality of image files for causing the associated images to be displayed on a display screen;
    selecting from the content image files a plurality of image files and combining the selected image files into a single merged image file that has a smaller file size than the sum of the file sizes of the selected image files;
    amending the computer instructions to accommodate the merged image file; providing the merged image file and the amended computer instructions to the mobile electronic device.

2. The method of claim 1 wherein in the selecting and combining step the images associated with the content image files are analyzed to identify images having a same or similar common dimension, and the selected image files are those for which the associated images have been identified as having a same or similar common dimension.

3. The method of claim 2 wherein the common dimension includes a common x-axis image width in pixels or a common y-axis image height in pixels.

4. The method of claim 1 wherein in the selecting and combining step the images associated with the content image files are analyzed to identify images having a same or similar common dimension in pixels and having color schemes falling within a predetermined similarity, and the selected image files are those for which the associated images have been identified as having a same or similar common dimension and color schemes falling within a predetermined similarity.

5. The method of claim 1 wherein the selecting and combining step includes combining the individual images associated with the selected image files into a merged image that includes each of the individual images in sub-regions thereof, the merged image file including graphic information for generating the merged image.

6. The method of claim 5 wherein the amending step includes amending the computer instructions so that each reference to one of the selected image files is replaced with a reference to the merged image file including information identifying the sub-region within the merged image that includes the individual image associated with the selected image file.

7. The method of claim 6 wherein the information identifying sub-regions includes coordinate data.

8. The method of claim 6 including assigning a unique image ID to each individual image in the merged image file and mapping each image ID to the sub-region in the merged image that includes the individual image to which the image ID has been assigned, wherein the image ID's and mapping information are included in the merged image file; wherein the information identifying sub-regions includes the unique ID's.

9. The method of claim 5 wherein individual images having a common height are merged into a row in the merged image.

10. The method of claim 1 wherein the selecting and combining step includes analyzing the images associated with the content image files to identify images having a common sub-region, and the selected image files include those for which the associated images have been identified as having a common sub-region; and combining the individual images associated with the selected image files into a merged image that includes only a single occurrence of the common sub-region.

11. The method of claim 1 wherein the content includes a webpage, the method including a step of receiving request for the webpage from the mobile electronic device, the computer instructions including code for a browser to render the webpage and in the step of providing the merged image file and the amended computer instructions, the merged image file and the amended computer instructions are sent to the mobile electronic device over a wireless network.

12. The method of claim 11 including a step of relaying the request for the webpage received from the mobile electronic device to a content source.

13. The method of claim 11 including an initialization step of configuring a browser on the mobile electronic device to process the amended computer instructions.

14. The method of claim 1 wherein the content includes an application for the mobile electronic device.

15. A wireless connector system for interfacing between a content source and a wireless network servicing a plurality of mobile electronic devices, the content source providing content including (i) a plurality of content image files each including graphics information for generating an associated image and (ii) computer instructions including references to the plurality of image files for causing the associated images to be displayed on a display screen, the wireless connector system including:
  a server computer including a data conversion module for converting content into a format for communication over the wireless network, the data conversion module including:
  (a) selection means for selecting from the content image files a plurality of image files that can be combined together to form a single image file that will have a smaller file size than the sum of the file sizes of the selected image files;
  (b) combining means for combining the selected image files into a single merged image file; and
  (c) amending means for amending the computer instructions to accommodate the merged image file;
  the wireless connector system being configured for sending the merged image file and the amended computer instructions over the wireless network to the mobile electronic device.

16. The system of claim 15 wherein the selection means is configured to analyze the images associated with the content image files to identify images having a common dimension falling within a predetermined similarity in number of pixels, and the selected image files are those for which the associated images have been identified as having a common dimension.

17. The system of claim 15 wherein the selection means is configured to analyze the images associated with the content image files to identify images having a common dimension falling within a predetermined similarity in number of pixels and having color schemes falling within a predetermined similarity, and the selected image files are those for which the associated images have been identified as having a common dimension and color schemes falling within a predetermined similarity.

18. The system of claim 15 wherein the combining means is configured to combine the individual images associated with the selected image files into a merged image that includes each of the individual images in sub-regions thereof, the merged image file including graphic information for generating the merged image.

19. The system of claim 18 wherein amending means is configured to amend the computer instructions so that each reference to one of the selected image files is replaced with a reference to the merged image file including information identifying the sub-region within the merged image that includes the individual image associated with the selected image file.

20. A computer program product having a computer-readable medium tangibly embodying computer executable instructions for modifying content for use on a mobile electronic device, the content including (i) a plurality of content image files each including graphics information for generating an associated image and (ii) computer instructions including references to the plurality of image files for causing the associated images to be displayed on a display screen; the computer executable instructions including executable instructions for:
  (a) selecting from the content image files a plurality of image files that can be combined together to form a single image file that will have a smaller file size than the sum of the file sizes of the selected image files;
  (b) combining the selected image files into a single merged image file;
  (c) amending the computer instructions to accommodate the merged image file;
  (d) providing amended content including the merged image file and the amended computer instructions for transfer to the mobile electronic device.

* * * * *